United States Patent [19]

Ohlson

[11] 4,248,443
[45] Feb. 3, 1981

[54] FOLDABLE STROLLER

[75] Inventor: Edward L. Ohlson, Chagrin Falls, Ohio

[73] Assignee: Prime Line Industries, Inc., Cleveland, Ohio

[21] Appl. No.: 954,480

[22] Filed: Oct. 25, 1978

[51] Int. Cl.³ .............................................. B62B 7/06
[52] U.S. Cl. .................................... 280/39; 280/647; 280/650
[58] Field of Search ................... 280/650, 39, 647, 38, 280/639, 638, 657, 658, 40

[56] References Cited

U.S. PATENT DOCUMENTS

| | | | |
|---|---|---|---|
| 904,542 | 11/1908 | Ledig | 280/39 |
| 1,869,205 | 7/1932 | Mahr | 280/647 |
| 2,415,629 | 2/1947 | Ford | 280/39 |
| 2,545,336 | 3/1951 | Binder | 280/650 |
| 2,571,442 | 10/1951 | Griffith | 280/655 |
| 2,693,366 | 11/1954 | Randolph | 280/39 X |
| 3,000,645 | 9/1961 | Schmidt | 280/39 |
| 3,222,100 | 12/1965 | Lindzy | 280/647 X |
| 3,443,823 | 5/1969 | Perego | 280/650 |
| 3,918,734 | 11/1975 | Firth et al. | 280/650 |
| 4,026,568 | 5/1977 | Hallam | 280/650 X |
| 4,032,173 | 6/1977 | Clegg | 280/650 |
| 4,062,555 | 12/1977 | Peng et al. | 280/647 X |
| 4,083,579 | 4/1978 | Basey, Jr. et al. | 280/650 |

FOREIGN PATENT DOCUMENTS

1042450  6/1953  France ................................ 280/39

*Primary Examiner*—John J. Love
*Assistant Examiner*—Milton L. Smith
*Attorney, Agent, or Firm*—Watts, Hoffmann, Fisher & Heinke Co.

[57] ABSTRACT

A stroller which is foldable to a flat rectangular configuration has an occupant seating structure, seat supporting structure, seat supporting members extending downwardly from the seat to ground engaging wheels, and a handle connected to one of the structures for transmitting motive and steering forces. Bearing structure transmits load forces from the seat to the seat supporting members and rotatably supports each seat supporting member for pivotal folding movement so that the wheel supporting structure is foldable to an orientation generally parallel with and closely adjacent the occupant seat. The handle is pivotally foldable about an axis vertically adjacent the seat so that the folded handle is orientated substantially parallel with and closely adjacent the seat.

11 Claims, 9 Drawing Figures

FOLDABLE STROLLER

BACKGROUND OF THE INVENTION

1. Field of the Invention

The present invention relates to strollers and more particularly relates to strollers which are constructed and arranged to be folded for storage from erected conditions.

2. Prior Art

Strollers and buggies for infants have commonly been constructed so that they can be collapsed, or folded, for storage when they are not in use. In designs of this sort the stroller or buggy framework was often of heavy duty construction. The features of their constructions permitting folding were principally useful for storing the device in an attic or basement between periods of frequent usage or in packing them for travelling.

In many proposals the wheels and/or their suspensions had to be detached or at least partly disassembled or the handles disassembled, etc., in order for the device to be confined for storage. Devices of this sort were not conveniently foldable for hand carrying or convenient transport in an automobile because of the difficulties encountered in folding or collapsing them and because of their size and bulk when folded. An example of a device of this general sort is disclosed in U.S. Pat. No. 2,693,366.

In more recent times the requirements for usage of buggies and strollers have changed to the extent that the traditional design approaches have not always continued to be practical. In most urban environments a typical shopping excursion with an infant can involve driving an automobile to several shopping locations and spending only a short time at each. The ability to quickly fold and erect a stroller in these circumstances is essential. Moreover, many automobiles have storage spaces which are too limited to conveniently accept many traditional strollers, even when folded. Still further, because of the possibility of theft, strollers cannot be left unattended when their use in a particular building or space is inconvenient or prohibited. In these circumstances the strollers must be carried by the user.

Stroller constructions have been proposed which avoid some of the shortcomings of the prior art strollers. The most common of these designs is a stroller which is transversely collapsed into a configuration not unlike an oversized folded umbrella. Examples of this kind of construction are illustrated by U.S. Pat. Nos. 4,062,555; 4,032,173; and 4,083,579. While these strollers were much more easily carried about when folded and more conveniently stored between uses, their folded configurations still restricted the user's ability to handle an infant and/or additional hand carried items when carrying the folded stroller.

SUMMARY OF THE INVENTION

The present invention provides a new and improved foldable stroller of simple light weight construction which is readily folded and erected and wherein the folded configuration of the stroller has a relatively small flat rectangular shape enabling it to be carried by hand like a valise or by a shoulder strap so that the portability and storage characteristics of the new stroller when folded are superior.

In a preferred embodiment the new stroller includes an occupant seating structure forming a generally horizontal occupant seat when the stroller is erected and seat supporting structure including downwardly extending members on opposed sides of the seating structure carrying ground engaging wheels. The seat supporting members are each foldable to an orientation generally parallel with and closely adjacent the occupant seat. A handle assembly is pivotally connected to one of the structures for folding movement about an axis adjacent the occupant seat so that the folded handle is substantially parallel with and closely adjacent the occupant seat. The folded stroller thus assumes a flat compact configuration when folded.

In a preferred embodiment of the new stroller the seat supporting members are disposed on opposite lateral sides of the seating structure with their folding axes extending longitudinally of the stroller. The handle is foldable about an axis extending transversely to the seat supporting member folding axes. The handle and supporting structure cooperate so that these components resist relative movement once the stroller is erected and the stroller is thus maintained in its erected condition.

In a preferred construction the occupant seat is formed by a fabric supported by a seat frame. The handle assembly likewise carries a back rest formed by a suitable fabric. When the stroller is folded it is insertable into a rectangular fabric container, open on one major face. The container is detachably connected to the folded stroller with the fabric of the back rest or occupant seat extending substantially across and closing the open container face. The folded stroller is thus substantially enclosed for storage or carrying. The container is preferably designed so that it can be reconnected to the stroller when erected and serve an alternative function, for example, as a container in which packages etc. can be placed when the stroller is in use.

Other features and advantages of the invention will become apparent from the following description of a preferred embodiment made with reference to the accompanying drawings which form part of the specification.

DESCRIPTION OF A PREFERRED EMBODIMENT

Figures 1, 2:
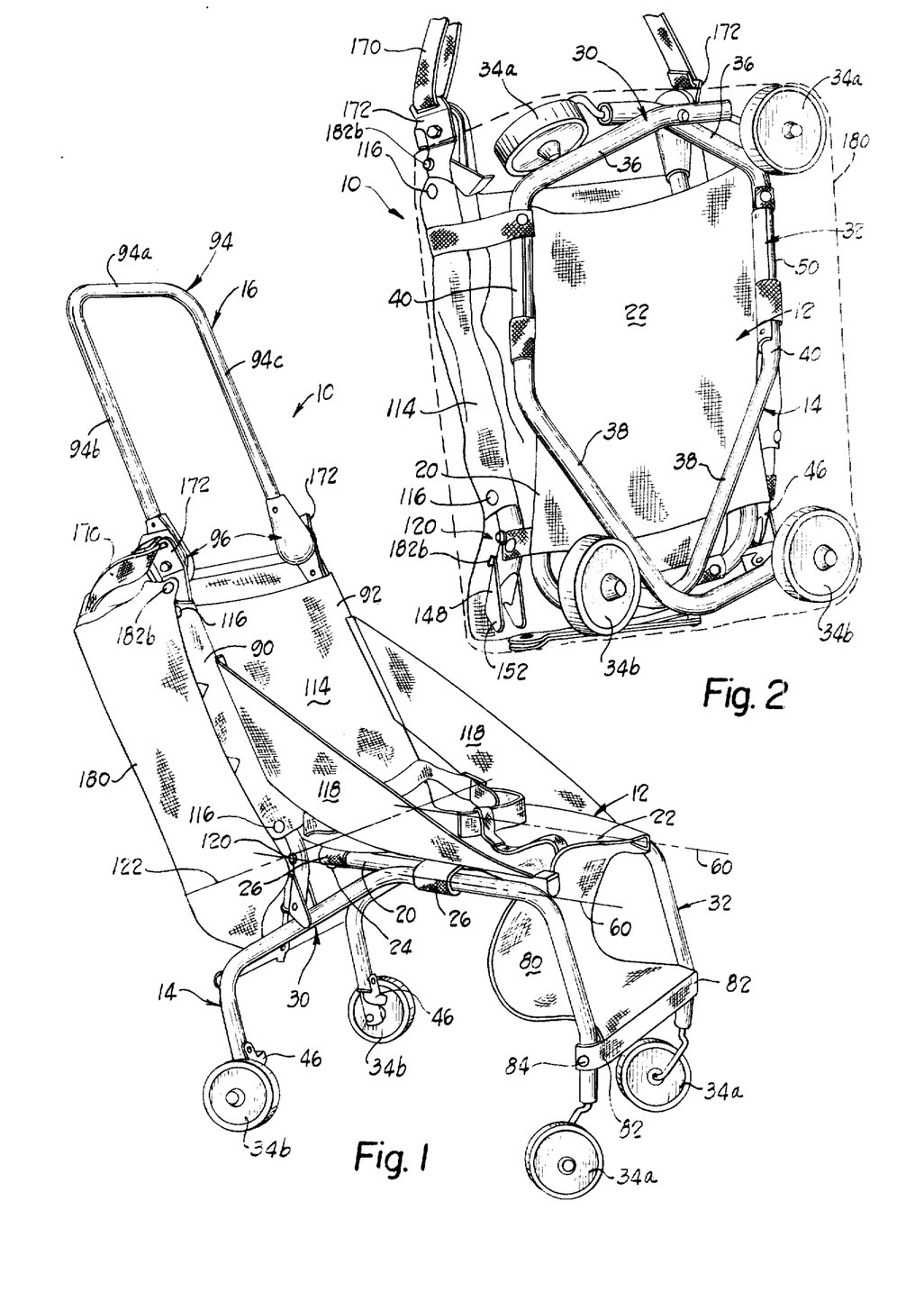
FIG. 1 is a perspective view of a foldable stroller embodying the present invention.
FIG. 2 is a perspective view of the stroller of FIG. 1 in its folded configuration.
Figures 3, 4:
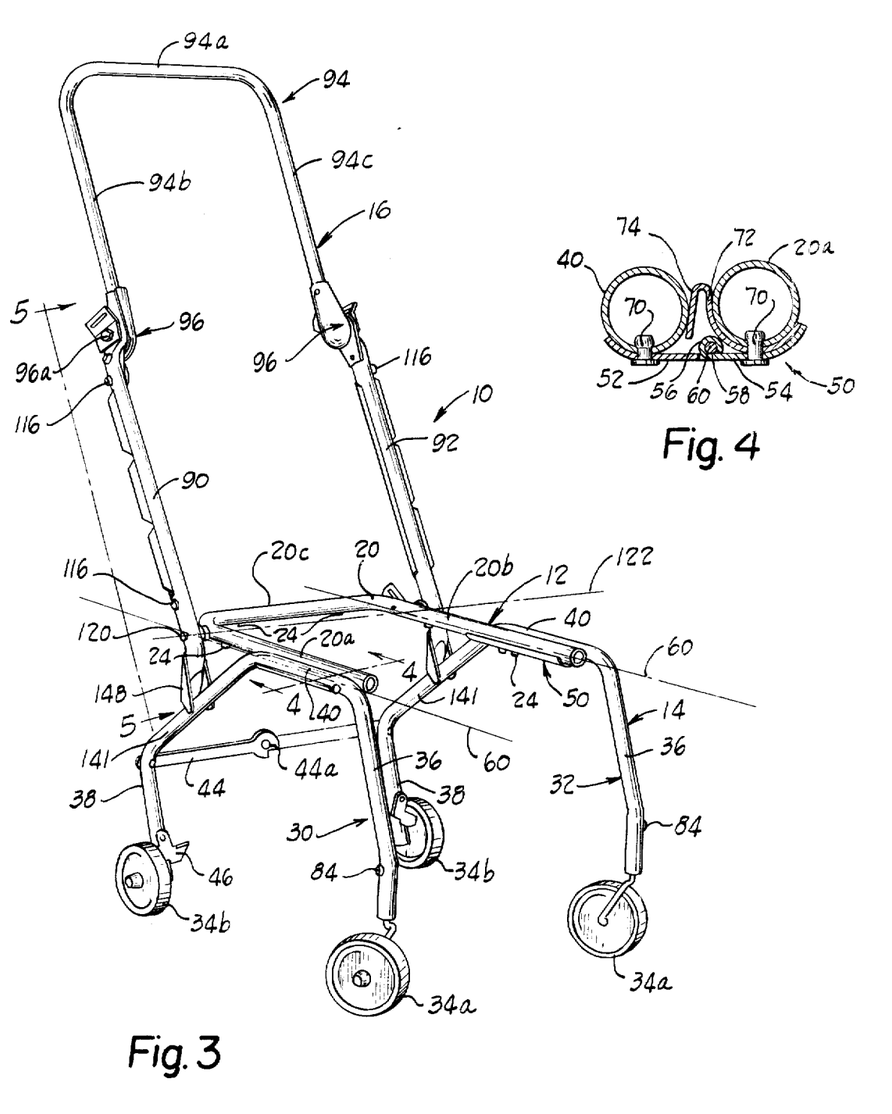
FIG. 3 is a perspective view of the stroller illustrated by FIG. 1 with parts removed.
FIG. 4 is a cross-sectional view seen approximately from the plane indicated by the line 4—4 of FIG. 3.

A stroller 10 embodying the present invention is illustrated by FIGS. 1-3 and, as best illustrated by FIG. 1 comprises an occupant seating structure 12, a seat supporting structure, generally designated by the reference character 14, and a handle assembly 16. From its erected condition illustrated by FIG. 1 the stroller 10 is foldable into a flat, generally rectangular configuration which is illustrated by FIG. 2 and when so configured the stroller is easily carried and conveniently stored even in relatively small storage spaces.

The occupant seating structure 12 is effective to provide a generally horizontal occupant support when the stroller is erected. Referring to FIGS. 1 and 3 the seat structure 12 is comprised of a seat frame 20 and a seat 22 which is detachably connected to the frame 20. In the illustrated embodiment the support frame 20 is generally U-shaped and includes a pair of leg portions 20a, 20b which extend longitudinally relative to the stroller and a transversely extending frame portion 20c extending horizontally across the rear of the seating structure. The preferred seat frame is constructed from a single piece of strong light weight metal tubing which is bent into the U-shaped configuration.

The seat 22 is preferably formed from a fabric which provides for a light weight yet durable construction. The seat fabric is a weather-resistant washable fabric, such as denim or canvas, and extends tautly between the support frame legs to provide a firm, stable occupant seating surface. The seat 22 is readily detachable from the seat frame for washing or cleaning but need not be removed in order to fold the stroller.

The seat 22 is detachably connected to the frame by fasteners 24 and in some locations by fasteners associated with straps 26. The seat 22 is tailored to provide pocket-like spaces into which the forwardly projecting ends of the frame legs 20a, 20b extend while at the rear of the support frame the seat fabric extends around the transverse frame portion and is detachably fixed in place by the fasteners. The straps 26 are preferably fashioned from heavy duty washable webbing and, as illustrated by FIG. 1, extend transversely from the side of the seat around the frame leg portions 20a, 20b and are anchored in place by fasteners. The fasteners may be of any suitable construction and are illustrated as conventional snap-on fasteners having one element fixed to the seat or strap fabric and the mating element fixed to the frame.

The seat supporting structure 14 suspends the occupant seating structure 12 and bears the load placed on the stroller by its occupant and/or other contents. In a preferred embodiment the seat supporting structure 14 comprises first and second seat supporting members 30, 32 which extend downwardly from the seat structure 12 on opposite sides with each of the seat supporting members 30, 32 carrying at least one ground-engaging wheel assembly 34. The members 30, 32 are preferably light weight strong metal tubular members with each defining a forward leg 36, a rear leg 38 and a body portion 40 coextending with a respective seat frame leg.

The rear legs 38 are interconnected by a jointed link bar 44 which is straightened when the stroller is in its erected condition and aids in maintaining the support members erected. The link bar 44 is provided with a pivot joint 44a substantially at its center so that when the seat supporting members 30, 32 are folded, as illustrated by FIG. 2, the link bar 44 is also folded and accommodates the motion of the members 30, 32. The opposite ends of the link bar 44 are pivotally attached to the respective rear legs 38 to enable folding the link bar.

The stroller is provided with swivel-mounted front wheel assemblies 34a one of which is fixed to the lowermost end of each forward leg 36 and fixed axle wheel assemblies 34b one of which is connected to the lower end of each rear leg 38. The swivelable front wheels 34a permit easy steering of the stroller while the fixed axle rear wheels provide directional stability. Suitable or conventional parking brakes 46 are provided on the rear wheel assemblies 34b.

The wheel base of the stroller is substantially the same as the longitudinal length of the seating structure 12 so that when the support members 30, 31 are folded the seating structure and support structure have essentially the same length. The height of the members 30, 31 is preferably the same as the transverse dimension of the seating structure and thus when the members 30, 31 are folded, the width of the folded assembly is substantially the same as the stroller width when erected.

A bearing structure 50 coacts between the occupant seating structure and the support structure 14 to transmit the stroller load from the seating structure 12 to the support structure 14 as well as to constrain the support structure for pivotal movement between folded and erected orientations. In the preferred and illustrated stroller the bearing structure 50 is formed by hinge assemblies one hinge assembly connecting each seat support structure to the seating structure. One hinge assembly is illustrated in cross section by FIG. 4 of the drawings. The hinge assemblies are preferably identical "piano" hinges, each including hinge plates 52, 54 which are attached, respectively, to a body portion 40 and the adjacent seat frame leg. The hinge plates form interfitting knuckles 56 along their longitudinal extents. The knuckles 56 in turn receive a hinge pintle, or pin, 58 which defines a folding axis 60 extending longitudinally along and vertically adjacent the seating structure (see also FIG. 3).

In the preferred stroller the hinge plates 52, 54 are attached to the seat frame legs and associated seat support members by rivets 70. A motion stop member 72 is interposed between each body portion 40 and adjacent seat frame leg to limit movement of the support member from its folded position beyond its erected position. The preferred and illustrated stop member 72 is formed by a sheet metal element which is interposed between the seat frame leg and the hinge plate 54 and riveted in place, with the hinge plate, to the seat frame leg. The sheet metal element follows the curvature of the frame leg tube and a re-entrantly curved lip 74 is formed on the element between the seat frame and the body portion 40. The lip 74 provides a stiffly resilient abutment against which the body portion 40 is moved when the support member is in its erected position.

The seat support members 30, 32 are folded about their respective folding axes by "breaking" the pivot joint 44a in the center of the link bar 44 and folding the members 30. 32 toward each other so that each leg member lies generally in a plane parallel to and adjacent the seat structure. The construction of the stroller substantially reduces the possibility of the stroller occupant being pinched by relative movement of the foldable stroller components. The piano hinge construction of the bearing structure 50, supplemented by the resilient motion stop member 72, assures that the body portions 40 and their adjacent seat frame leg portions remain relatively rigidly spaced apart when the stroller is erected so that they do not pinch the occupant. The link bar pivot joint 44a is located remotely from the occupant so that there is virtually no chance of occupant pinching by the link bar 44.

The illustrated seat 22 has a fabric apron-like section structure to provide an occupant foot and leg support, prevent the possibility of the occupants' foot or leg from being lodged between the seat and ground and twisted as a result of forward movement of the stroller, as well as forming a partial windbreak. The section 80 is detachably connected to the forward legs 36 by webbing straps 82 and fasteners 84. The fasteners 84 are preferably snap fasteners each having a fastener element attached to a strap 82 and an element fixed to the leg 36. The apron-like fabric section 80 offers no resistance to folding the members 30, 31 so that the folded seat supporting members are substantially flush against the seat structure when completely folded (see FIG. 2). Folding the stroller is accomplished without requiring the fabric seat 22 to be loosened or otherwise removed from the seat frame 20. The apron section 80 can be detached from the forward legs and laid flush against the seat 22 prior to folding if desired, particularly if the stroller is to remain folded for a considerable period of time.

The handle assembly 16 extends upwardly from the rear of the stroller for transmitting steering and motive forces to the stroller. The handle assembly is constructed and arranged for folding into confronting relationship with one of the seat or seat support structures when the stroller is folded. In the preferred and illustrated stroller the handle assembly 16 is formed in part by first and second handle members 90, 92 which extend from the stroller when it is erected, and a third handle member 94 interconnecting the ends of the handle members 90, 92 remote from the seating structure and joint structure 96 between the handle member 94 and the members 90, 92 to enable shortening of the handle assembly when the stroller is operated to its folded configuration.

The handle members 90, 92 are spaced apart and extend parallel to each other upwardly and rearwardly away from the rear section of the seating structure. The handle members extend from the opposite lateral sides of the seating structure and are formed from light weight yet structurally strong metal tubes. The third handle member is formed from the same kind of tubing but is U-shaped to include a transverse grip section 94a and leg portions 94b, 94c which extend to the first and second handle members.

The joint structure 96 is preferably a pivot joint formed between the projecting end of each of the handle members 90, 92 and the respective third handle member leg portions to allow the third handle member to be folded over and received between and substantially within the length of the first and second handle members. This minimizes the folded length of the handle assembly 16. The lengths of the handle members 90, 92 and the handle member legs 94b, 94c are about the same as the longitudinal extent of the seating structure so that when folded the handle assembly coextends with the seat.

The pivot joint structure 96 includes a pivot pin 96a extending between overlapped adjacent ends of the handle members and a handle lock for preventing the handle member 94 from being pivoted forwardly from its erected position when the stroller is pushed.

Figure 7:
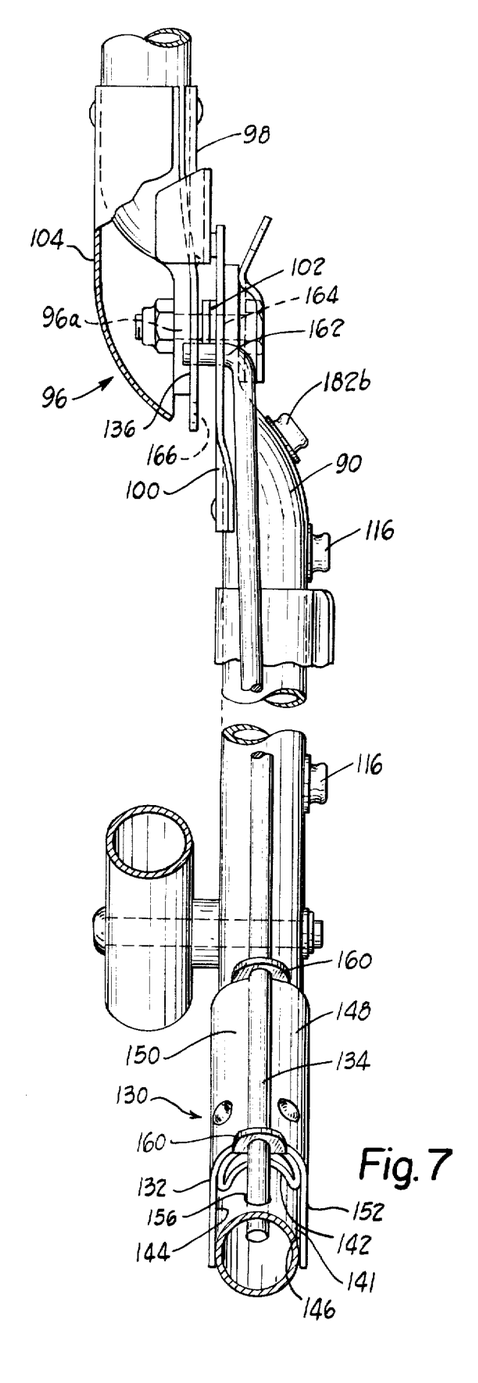
FIG. 7 is a view seen approximately from the plane indicated by the line 7—7 of FIG. 5.
Figure 8:
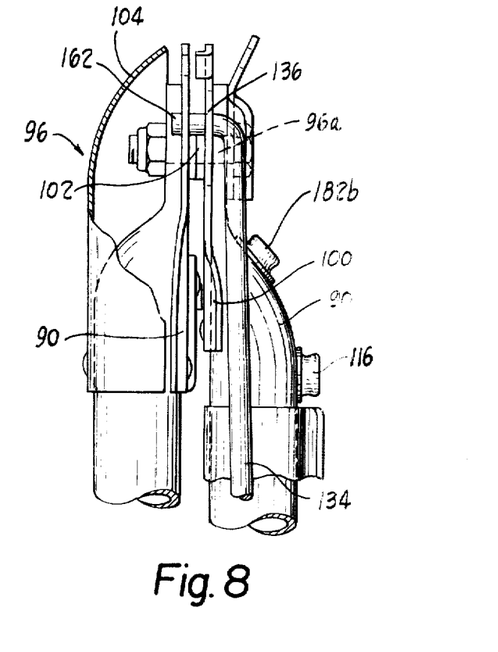
FIG. 8 is a view seen approximately from the plane indicated by the line 8—8 of FIG. 6; and, FIG. 9 is a perspective view of a portion of the stroller forming a storage container for the stroller when folded.

The tubular handle members are flattened to define the overlapped ends (see FIGS. 7 and 8) and confronting plates 98, 100 are riveted, respectively, to the handle members to extend between the flattened handle member end portions. The flattened handle ends and the plates 98, 100 are provided with aligned openings through which the pivot pin 96a extends. Washers 102 surrounding the pin 96a are interposed between the plates 98, 100 to maintain the plates axially separated.

The illustrated pivot pin 96a is a screw which receives a nut for holding the handle members assembled yet relatively freely rotatable about the axis of the pin 96a. The pivot joint 96 is illustrated as provided with a shell-like cover 104 extending over the nut and threaded end of the pin 96a to protect the stroller occupant from contact and abrasion by the pin 96a.

The handle lock is formed by a pawl 106 (see FIGS. 5 and 6) supported on each of the leg portions 94b, 94c. The pawl is pivotally supported on the plate 98 and carries a lug 106a which is movable with respect to the plate 98 to engage a lug 108 formed on the plate 100 to prevent the handle member 94 from being rotated towards its folded position relative to the handle members 90, 92 whenever the stroller is pushed.

The handle assembly supports an occupant back rest 114 (FIG. 1) connected to the handle members 90, 92 and extending upwardly from the rear portion of the seat 20. The preferred back rest 114 is tailored from the same fabric as the seat 20 and is integral with the seat. The back rest is detachably connected to the handle members 90, 92 by suitable fasteners 116, for example, snap fasteners having mating elements attached to the back rest and to the handle members. The back rest fabric extends tautly between the members 90, 92 with its upper edge extending just below the joint structure 96 so that the back rest fabric does not interfere with folding the handle assembly. Fabric arm-like restraints 118 (FIG. 1) extend between the seat and back rest at the opposite lateral sides of the stroller. The restraints 118 are sewn to the seat and back rest, are collapsed when the stroller is folded and are removable from the stroller frame with the seat and back rest. The back rest and seat construction coact to shield the occupant from being pinched between portions of the seat frame and handle assembly.

The handle members 90, 92 are connected to the seat frame 20 by a pivot connection generally indicated by the reference character 120. The handle assembly 16 is thus pivotable relative to the seating structure about a folding axis 122 extending transverse to the direction of the folding axes 60 and disposed substantially in a plane occupied by the seating structure. This enables the handle to be moved into a substantially parallelly extending relationship with the seat structure when the handle is folded from its erected position.

In the illustrated stroller the pivot connection 120 is formed by pivot pins each mounted in a respective seat frame leg and extending laterally from the seat frame leg to the adjacent handle member 90, or 92.

The handle assembly is thus foldable onto itself about the pivot joint structure 96 and foldable about the axis 122 into confronting relationship with the seat structure. The handle assembly, when folded as described, has a total length about the same as the wheel base of the stroller.

A locking assembly, generally designated by reference character 130, is provided for coacting between the seat supporting structure and the handle assembly to maintain the stroller in its erected condition. The locking assembly 130 includes an abutment structure 132 for positioning the seat supporting structure and the handle assembly for locking in the erected condition and at least supplementally maintaining the stroller erected, a locking element 134 reacting between the handle assembly and the support structure, and a locking element actuating mechanism 136 for operating the locking element between lock and unlock positions. An abutment structure 132, locking element 134 and actuating mechanism 136 are associated with each of the handle members 90, 92 and only the locking assembly components associated with the handle member 90 are described in detail since the components associated with the handle member 92 are identical.

Referring to FIGS. 5-8, the abutment structure 132 is formed by a projecting end section 140 of the handle member 90 which projects beyond the pivot connection 120 toward an inclined portion 141 of the rear leg 38. The tip of the handle member is flattened and formed into a concave portion 142 which conforms to the peripheral shape of the rear leg 38. When the seating structure has been erected and the handle assembly is moved to its erected position the concave portion 142 engages the inclined rear leg portion 141 and positively limits motion of the handle members beyond the erected positions.

The end section 140 also includes guide faces 144, 146 (FIG. 7) which engage the leg 38 to align the leg with the concave handle portion 142 and to resist folding of the legs when the handle is erected. The guide faces 144, 146 extend from the concave portion 142 along opposite sides of the included rear leg portion 141. In the preferred and illustrated embodiment the guide faces 144, 146 are formed on a sheet metal bracket 148 which has a spine 150 riveted to the rear side of the portion 142 and arms 152 which extend along opposite sides of the inclined leg portion 141. The guide faces 144, 146 are formed by the inner faces of the arms 152 and engage the rear leg at locations which are spaced radially from the axis 60 to inhibit motion about that axis.

The locking element 134 is formed by a rod supported on the handle member 90 for sliding movement into and out of a conforming opening 156 formed in the rear leg just to the rear of the projecting handle member end section. The rod 134 defines laterally facing peripheral portions which abut adjacent laterally facing sides of the opening 156 to lock the seat support member against rotation about the axis 60 and forward and rearward peripheral portions which abut forward and rearward sides of the opening 156 to prevent the erected handle from being pivoted about its folding axis 122.

In the preferred and illustrated embodiment of the invention the actuating mechanism 136 is formed integrally with the pivot joint structure 96 so that when the handle member 94 is moved to its erected position the locking element 134 is shifted into the opening 156 sufficiently far to lock the handle assembly and seat supporting member against relative motion. When the handle member 94 is moved to its folded position about the pivot joint structure 96, the locking element is withdrawn from the opening 156 to free the seat supporting structure and handle assembly for folding. The rod 134 extends along the rear of the handle member 90 through support and guiding eyes 160 formed integrally with the bracket 148.

The rod end adjacent the joint structure 96 is bent to define a transversely extending finger 162 which extends through an elongated arcuate guide slot 164 formed in the plate 100 and through a semicircular cam slot 166 formed in the plate 98. The cam slot 166 extends concentrically 180 degrees about the axis of the pivot structure 96. As the handle member 94 approaches its fully erected position with respect to the handle members 90, 92, one end of the cam slot 166 engages the rod finger 162 and forces the rod 134 endwise toward the handle member end section and into the opening 156. The abutment structure 132 assures proper alignment between the opening 156 and the rod end during this locking movement.

Figure 5:
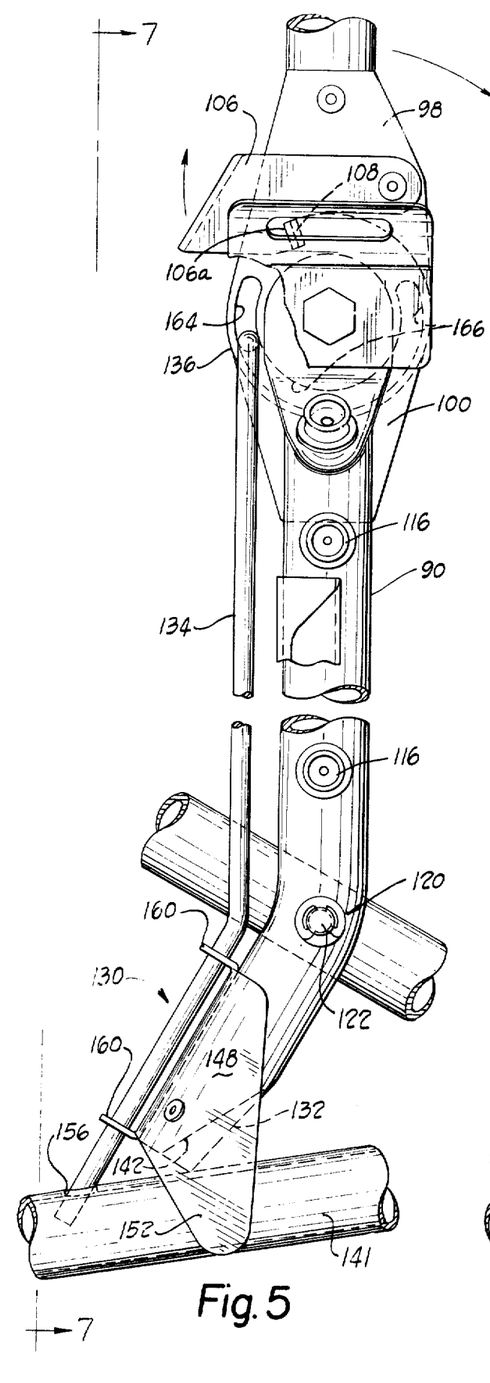
FIG. 5 is a cross-sectional view seen approximately from the plane indicated by the line 5—5 of FIG. 3.
Figure 6:
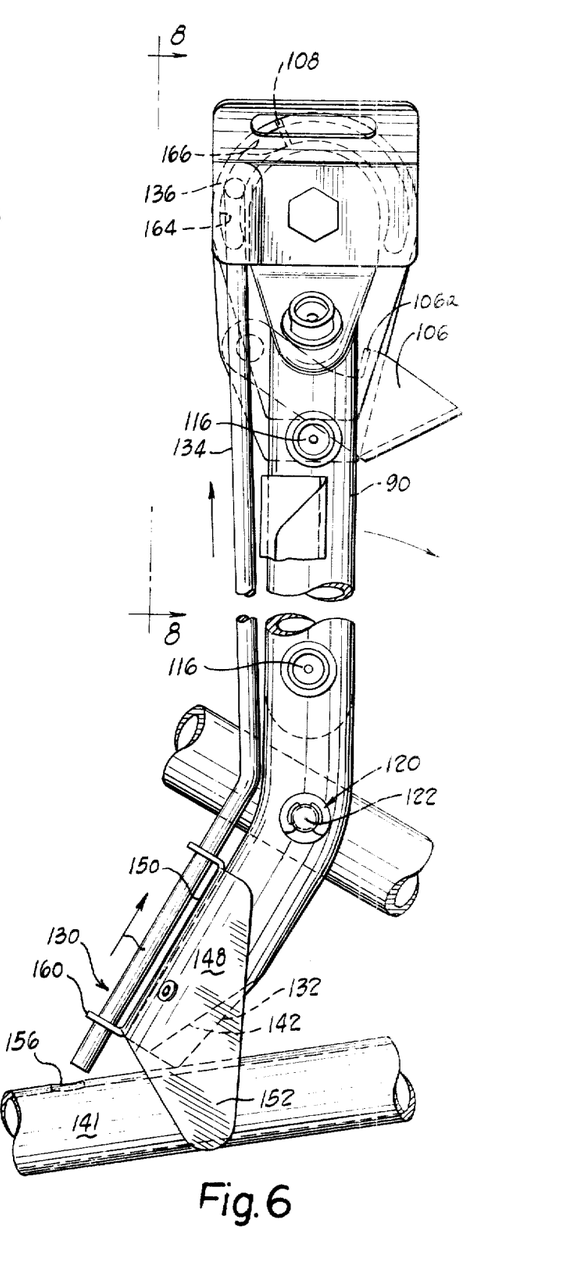
FIG. 6 is a view similar to FIG. 5 but with parts shown in a different operating position.

When the handle member 94 is fully erected the end of the cam slot 166 moves the rod finger 162 into engagement with an end of the guide slot 164 (see FIG. 5). This positively prevents the handle member 94 from being rotated past its fully erected position. When the handle member 94 is fully erected the pawl 106 is rotated to engage the abutments 106a, 108. The handle member 94 is then locked in place with respect to the handle members 90, 92.

When the stroller is to be folded the pawl 106 is shifted to unlock the handle member 94 and the handle member is pivoted about the axis of the pivot structure 96. As the handle member 94 moves into the plane of the handle members 90, 92 to its fully folded position, the opposite end of the cam slot 166 engages the rod finger 162 and moves the rod endwise out of the opening 156.

The guide slot 164 maintains the rod in its operative position yet permits the limited endwise motion required for locking and unlocking the stroller handle and legs.

The new stroller is particularly adapted for transporting by use of a shoulder strap when folded because of its compactness. In the preferred and illustrated stroller a shoulder strap 170 (FIGS. 1 and 2), formed from suitable webbing, has its opposite ends attached to the projecting ends of the handle members 90, 92 by slotted plates 172 which are clamped to the handle members by the heads of the pins 96a. The shoulder strap feature permits the folded stroller to be transported while freeing the user's hands and arms.

A container 180 for the folded stroller is illustrated by FIGS. 1, 2 and 9. The container 180 is preferably formed from the same type of fabric used for the seat and back rest and is tailored to define a relatively flat rectangular volume open across one major face. The illustrated container is a pouch-like structure defining a rear wall 180a forming the rear major face of the volume, shallow side walls 180b-e and a narrow lip 180f extending across one end of the open major face. The container is detachably connectable to the handle members 90, 92 by fasteners. The fasteners are preferably snap fasteners including fastener elements 182a attached to the container sidewalls 180b, 180d and coacting elements 182b fixed to the handle members.

When the stroller is folded so that the supporting structure 14 and handle assembly 16 are flat against the seat, the container 180 is removed from the handle members and fitted over the folded stroller so that the wheels, legs, seat and handle are received within the container volume (see FIG. 2). The container is then attached to the handle members 90, 92 by the fasteners 182. The back rest 114 extends substantially fully across the open major face of the container so that the folded stroller is effectively completely encased.

The top wall 180e is slightly narrower than the remaining container sidewalls and permits the handle pivot structures 96 to project from the upper side of the container. The shoulder strap anchor plates thus extend from the upper end of the container and the strap 170 is easily accessible. This enables the stroller to be carried like a shoulder bag freeing the user's hands.

When the stroller is erected the container 180 is snapped on the rear side of the handle assembly to form a storage space on the stroller. The open major container face confronts the back rest 114 (FIG. 1) so that the back rest forms a wall of the container. Packages, etc. can thus be placed in the container space when the stroller is erected. The narrow top wall 180e defines one side of an access opening into the container. In the preferred stroller construction the back rest 114 is constructed with a depending flap section which extends over the lip 180f and across the bottom of the carrying space. The container 180 also includes a pocket 183 in the rear wall 180a.

While a single embodiment of the invention has been illustrated and described in considerable detail the invention is not to be considered limited to the precise construction disclosed. Various adaptations modifications and uses of the invention may occur to those skilled in the art to which the invention relates. As an example, the container 180 could be connected to the handle assembly to form a canapy when the stroller is erected. The intention is to cover all such adaptations modifications and uses which come within the spirit or scope of the appended claims.

What is claimed is:

1. A stroller which is foldable to a substantially flat compact configuration comprising:
   (a) occupant seating structure defining a generally horizontal occupant support when the stroller is erected;
   (b) seat supporting structure comprising:
      (i) seat supporting members disposed on respective opposed sides of said seating structure and extending downwardly from said occupant support,
      (ii) at least one ground engaging wheel connected to each of said seat supporting members;
   (c) bearing structure between said seating structure and said seat supporting structure, said bearing structure transmitting load forces from said seating structure to said seat supporting members and connecting said seat supporting members to said seating structure for pivotal folding movement about a folding axis extending along the associated side of said seating structure and vertically adjacent said occupant support, said bearing structure enabling pivotal folding of said seat supporting structure to an orientation generally parallel with and closely adjacent the occupant support;
   (d) handle means connected to at least one of said occupant seating or bearing structures for transmitting motive and steering forces; and
   (e) connecting means between said handle means and said at least one structure, said connecting means comprising a pivot member supporting said handle means for pivotal folding movement about an axis vertically adjacent said occupant support so that said handle means is foldable from an erected position for transmitting motive and steering forces to an orientation substantially parallel with and closely adjacent said occupant support;
   (f) said handle means comprising an end section projecting beyond said connecting means and engaging at least one of said seat supporting members at a location spaced from said folding axis to prevent folding movement of said at least one seat supporting member about said axis when said handle means is in its erected position.

2. The stroller claimed in claim 1 wherein said handle means comprises at least first and second handle members and joint structure between said handle members enabling the length of the handle means to be reduced substantially when the stroller is operated to its folded condition.

3. The stroller claimed in claim 2 wherein said joint structure between said handle members includes a pivot enabling one of said handle members to be pivotally folded to coextend with said other handle member adjacent said occupant support when the stroller is folded.

4. A stroller as claimed in claim 1 further including locking means for connecting said handle means to said supporting structure, said locking means comprising a locking member supported by said handle means end section for movement into and away from engagement with said at least one seat supporting member.

5. A stroller which is foldable into a flat generally rectangular storage configuration comprising:
   (a) occupant seating structure comprising a generally horizontally disposed seat frame member and an occupant support;
   (b) seat supporting structure comprising:
      (i) first and second seat support members each defining a portion extending along a lateral side of the seat frame and forward and rear legs extending downwardly from the seat frame when the stroller is erected; and
      (ii) ground engaging wheels connected to said legs;
   (c) bearing means for pivotally connecting each support member portion to said seat frame for swinging movement about a folding axis extending longitudinally relative to said stroller and adjacent the seating structure, each said support member foldable about its respective folding axis to a folded position extending immediately adjacent and parallel to said seating structure;
   (d) handle means comprising at least a handle member pivotally connected to said seating structure along an axis extending transversely with respect to said support member folding axes, said handle member pivotally movable from a folded position extending along said seating structure to an erected position, said handle member comprising a section extending into engagement with the supporting structure when the handle member is erected with the engagement between the handle means and supporting structure impeding folding of said supporting structure about said folding axes.

6. The stroller claimed in claim 5 further including locking means coacting between said handle means and said supporting structure for preventing relative movement between said handle member and said supporting structure when said stroller is erected, said locking means comprising a locking element movably supported by one of said handle means and support structure and movable into locking engagement between said handle means and said supporting structure when said stroller is erected.

7. The stroller claimed in claim 6 wherein said locking element is movably supported by said handle means, said handle means further including a second handle member connected to said first handle member remote from said seating structure by pivot means, and, actuating mechanism for said locking element operatively connected between said second handle member and said locking element, said second handle member pivoted with respect to said first handle member during erection of said stroller to actuate said locking element.

8. A stroller foldable into a flat compact configuration from an erected condition comprising:
   (a) a seat structure;
   (b) a seat supporting structure comprising first and second support members disposed on opposite lateral sides of the seat structure and extending downwardly toward ground engaging wheels;
   (c) handle means extending upwardly from the seat structure comprising first and second handle members spaced apart transversely adjacent the seat structure and interconnected remote from said seat structure;
   (d) bearing means for transmitting load forces from said seat structure to said first and second support members when the stroller is erected and for constraining said first and second members for pivotal folding movement about respective folding axes each extending adjacent one of said lateral sides and in a direction which is longitudinal relative to the stroller;
   (e) pivot means for connecting said handle members to said seat structure for pivotal folding movement about a handle folding axis extending in a direction transverse to said folding axes and adjacent said seat structure; and
   (f) locking means coacting between said seat supporting structure and said handle means for maintaining said stroller erected, said locking means comprising first abutment portions on the handle and seat supporting structure for preventing folding movement of a seat support member when the stroller is erected and second abutment portions on the handle and seat supporting structure for maintaining said handle means in its erected position.

9. A foldable stroller comprising:
   (a) occupant seating structure comprising a seat frame including transversely spaced frame leg portions extending longitudinally of the stroller and a seat supported between the frame leg portions;
   (b) supporting structure including support members each hinged to a respective one of said frame by portions for folding movement about an axis extending longitudinally relative to the stroller, the supporting structure defining leg portions carrying ground engaging wheel assemblies which are foldable flat against the seat about said axes;
   (c) a handle assembly comprising transversely spaced handle members pivoted to said seat frame for folding motion about a handle folding axis extending transversely of said stroller and a back rest extending transversely between said handle members, the handle assembly foldable flat against said seat about said handle folding axis; and,
   (d) a container member defining a flat rectangular volume open substantially across one major face, said container including fastener elements coacting with fastener elements on swaid handle members, the seating structure with the seat support structure and handle assembly folded flat against the seat being received in said container with the back rest substantially covering said open major face and said container detachably connected to said handle members by said fasteners.

10. A stroller which is foldable into a flat generally rectangular storage configuration comprising:
    (a) occupant seating structure comprising a generally horizontally disposed seat frame member and an occupant support;
    (b) seat supporting structure comprising:
       (i) first and second seat support members each defining a portion extending along a lateral side of the seat frame and forward and rear legs extending downwardly from the seat frame when the stroller is erected; and
       (ii) ground engaging wheels connected to said legs;
    (c) bearing means for pivotally connecting each support member portion to said seat frame for swinging movement about a folding axis extending longitudinally relative to said stroller and adjacent the seating structure, each said support member foldable about its respective folding axis to a folded position extending immediately adjacent and parallel to said seating structure;
    (d) handle means comprising first and second laterally spaced handle members pivotally connected to said seating structure along an axis extending transversely with respect to said support member folding axes, said handle members each defining a handle member section extending into engagement with a respective leg of the supporting structure when the stroller is erected, each said handle member section defining spaced abutment faces disposed closely adjacent opposite lateral sides of the associated leg with the engagement between the handle means and support structure tending to maintain the handle means and support structure in position with respect to each other.

11. The stroller claimed in claim 10 wherein said handle member sections each further defines an abutment engagable with said associated leg for limiting movement of said handle members beyond their erected positions.

* * * * *